United States Patent [19]

Huffman

[11] 4,236,250
[45] Nov. 25, 1980

[54] MULTILINE SWITCH

[75] Inventor: Charles E. Huffman, Plano, Tex.

[73] Assignee: Rockwell International Corporation, El Segundo, Calif.

[21] Appl. No.: 41,275

[22] Filed: May 21, 1979

[51] Int. Cl.³ .............................................. H04B 7/02
[52] U.S. Cl. ............................... 455/49; 340/147 SC
[58] Field of Search ................. 325/2, 3, 56; 358/142, 358/143, 904; 340/147 SC; 330/124 R; 333/3; 307/219, 204; 328/71; 455/8, 10, 17, 49, 52, 63

[56] References Cited

U.S. PATENT DOCUMENTS

| | | | |
|---|---|---|---|
| 2,733,296 | 1/1956 | Maggio | 325/3 X |
| 3,035,169 | 5/1962 | Griffith | 333/3 X |
| 3,072,748 | 1/1963 | Abraham | 325/56 |
| 3,111,624 | 11/1963 | Farkas | 340/147 SC |
| 3,588,700 | 6/1971 | Shiki et al. | 325/2 |

Primary Examiner—Benedict V. Safourek
Attorney, Agent, or Firm—Bruce C. Lutz; Howard R. Greenberg; H. Fredrick Hamann

[57] ABSTRACT

The present invention is directed to a system which accomplishes forwarding or retransmission of signals requiring preemphasis and signals not requiring preemphasis while using a single spare channel for forwarding either type of signal upon failure of a primary channel. This is accomplished by designing each channel to have passive and selectable circuits through which the signal is passed for preemphasis or attenuation depending upon the type of signal used in the primary portion of that communication channel before being applied to the selection switches of the spare channel.

6 Claims, 5 Drawing Figures ic4,236,250

MULTILINE SWITCH

THE INVENTION

The present invention is generally concerned with electronics and more specifically concerned with electronic switching systems of the type requiring a spare channel for reliability of signal passage during failure of one of the primary channels.

As pointed out in a book entitled, "Transmission Systems For Communications", published by Bell Telephone Laboratories, Fourth Edition, on Page 482, it is common to use a level shaping process for improving the performance of signals transmitted through communication systems. In message channels this is normally accomplished by a system called preemphasis and is used to improve the noise performance in an FM system. Very basically this is accomplished prior to being transmitted through the ether and is used to emphasize the power at the higher frequency levels in a manner whereby, for a given total amount of power to be used in the transmission, the noise introduced over the entire frequency spectrum is substantially constant in the received and deemphasized signal.

This same article and book referenced above also mentions that a similar type of preemphasis is applied to television transmission signals on FM microwave systems. Here however, it is not for the purpose of noise equalization but rather to improve the transmission of color information. Although in essence this is a preemphasis, it is normally referred to as predistortion and is usually predistorted ahead of the FM terminal transmitter rather than at the terminal transmitter.

Thus, the present invention comprises a switch which can receive either the already predistorted video signals and forward these signals or can take message signals which require preemphasis before transmission and transmit both types of signals over the system. Further, with a single spare channel, it can take either of these two types of signals and forward the signals when a primary channel fails whether the primary channel is designed to normally forward either the video or the message type signals.

The known prior art has always used separate switching networks to forward the two different types of video and message signals. In other words, a given switching and forwarding network having its own spare path was used for video signals and a different switching and forwarding network was used for message signals.

The present invention is able to utilize a single spare path by having passive networks in a spare section of each of the channels used to either merely attenuate or to preemphasize the signal prior to it being applied to the spare channel. This decision as to preemphasis or attenuation is made at the time that the switching network is placed in operation but can be manually altered at any later date. Although illustrated as a manual alteration, it is to be realized that electronic alterations could also be provided if the types of signals transmitted were to vary enough to warrant the extra flexibility in usage.

It is therefore an object of the present invention to improve the versatility of a switching system which forwards more than one type of signal wherein the types of signals are such that they would normally be noncompatible on a single spare communication channel due to amplitude and/or signal processing before transmitting differences.

Other objects and advantages of the present invention will be apparent from a reading of the specification and appended claims in conjunction with the drawings wherein:

DETAILED DESCRIPTION

Figure 1:
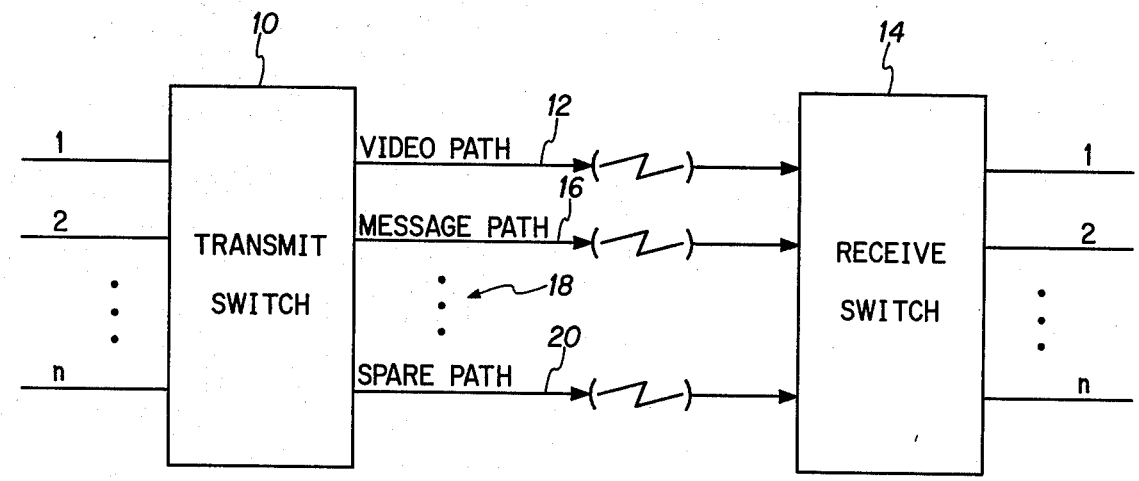
FIG. 1 is a block diagram of the system concept.

In FIG. 1 a transmit switch 10 receives video signals on channel 1 as a primary transmit channel which are transmitted via a video path 12 to a receive switch 14. Message signals are supplied on channel 2 to the transmit switch 10 and transmitted via a message path 16 to the receive switch 14. A series of dots generally indicated as 18 indicate a plurality of additional paths some of which may be video and the rest of which would be message signals and finally the n path which is a spare path or communication channel 20. In typical operation, the spare path is used to provide nonpriority signals until one of the primary paths 1 through n−1 fails. At this time the signal input on the n input is deactivated and signals being diverted from the input, that is, associated with the inoperative path, are forwarded down to the spare path. When the signals are received by the receive switch they are again diverted back to the output which is associated with the inoperative path. When the inoperative path is again in operating condition, the spare channel can be used for forwarding of low priority signals.

Figure 2A:
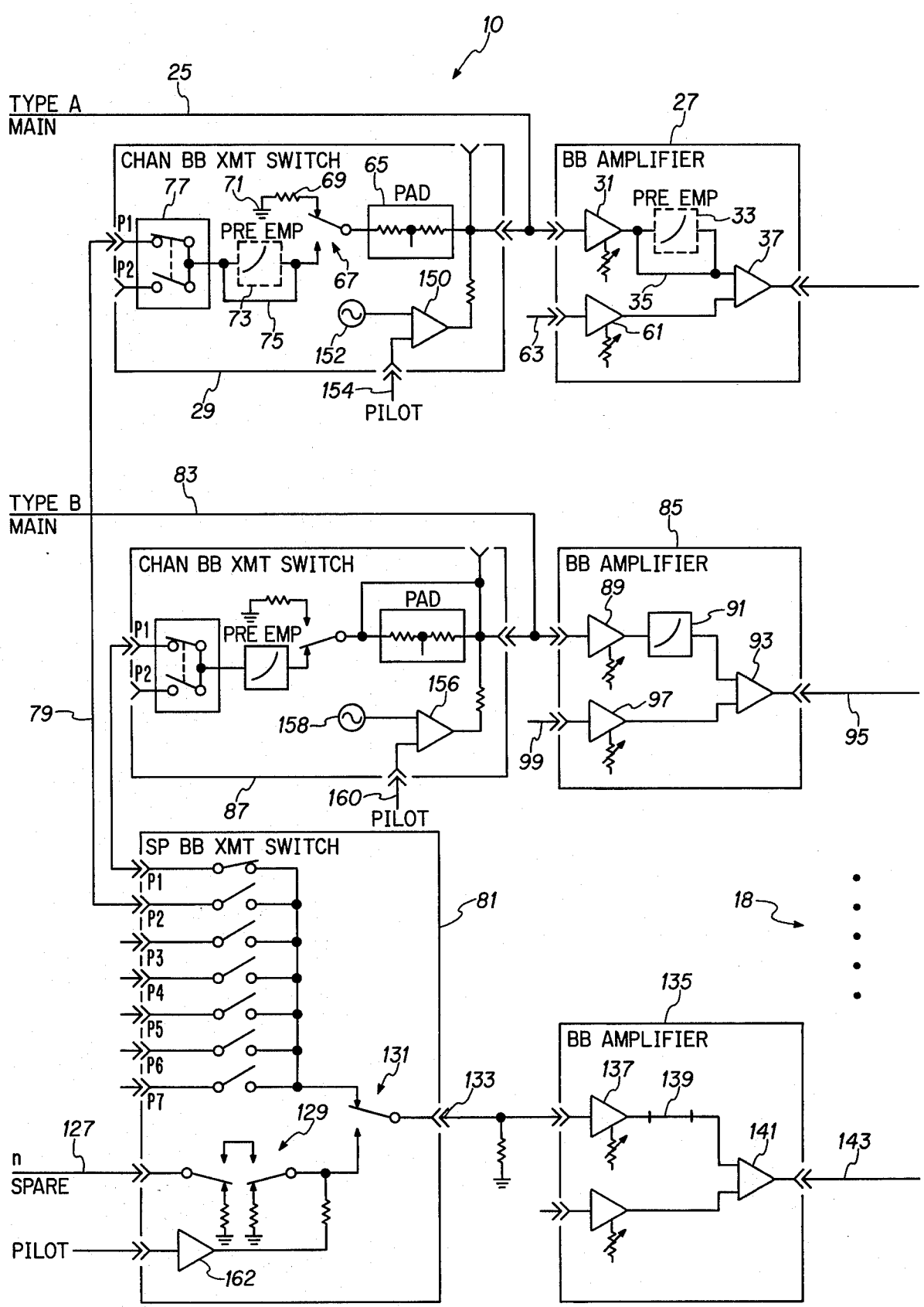
FIGS. 2a and 2b are a fairly detailed block diagram of the transmission and reception end of a multisignal type switch.
Figure 2B:
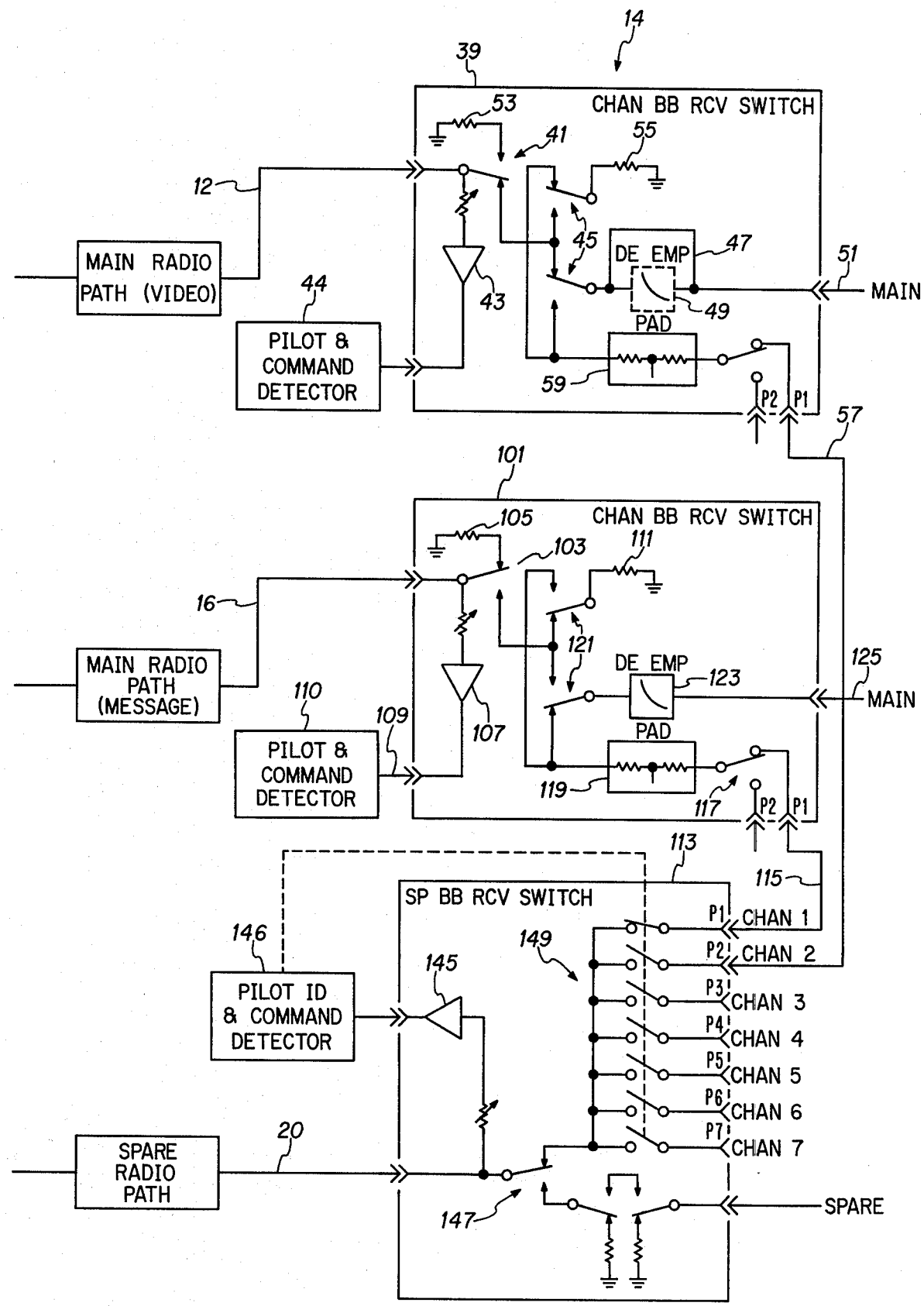

FIG. 2 shows in more detail the system of FIG. 1 wherein type A signals (video) are applied to the upper portion of the transmit switch 10 and normally forwarded via main radio path 12 for video signals. Type B or message signals are transmitted via the next stage of the transmit switch on line 16. A series of dots 18 indicates a plurality of further channel transmit switches, radio paths and channel receive switches. In one embodiment of the invention, there were seven main channels and one spare channel.

Returning to the upper portion of FIG. 2, it will be noted that signals are input on a line 25 to both a baseband amplifier block 27 and a channel transmit switch 29. Internal to amplifier block 27 is a preamplifier 31, a dash line preemphasis block 33, a strap or shorting wire 35 and an output amplifier 37. Output amplifier 37 provides signals to a main radio path including transmitter and receiver operating on channel 12 of the system. Channel 12 of the system is connected to a channel receive switch 39 which supplies signals both to a switch generally indicated as 41 and to an amplifier 43. Amplifier 43 provides output pilot and command signals to pilot and command detection equipment 44 for use in controlling the switch system. In the position shown, switch 41 is connected to pass signals from line 12 through switch 41, to a second set of switches 45 and to a bypass or strap 47 which may be connected in parallel with the deemphasis circuit 49 or deemphasis circuit 49 may be removed and the strap left in place. From strap 47, signals are output on a lead 51. If the switch 41 were in the alternate position, the input line 12 would be connected to ground through a 75 ohm impedance matching resistor 53. If switch 41 were connected in the opposite direction, the switch 45 would also be connected in the alternate position. As shown, the switch 45 is used to place a 75 ohm resistor 55 in the spare circuit such that a spare input line 57 is connected through an impedance matching pad 59 to ground through the 75 ohm resistor. The impedance matching pad 59 is used in a variable impedance fashion so that output signals at 51 will be identical in level whether they pass through the main channel path or the spare channel path. Returning to baseband amplifier 27, it will be noted that there is an additional amplifier 61 which receives command signals on an input 63.

The signals input on input 25 are also supplied to an input of the channel transmit switch 29. Within transmit switch 29 the signals are supplied to a pad 65 and from there pass through a switch generally indicated as 67 and a 75 ohm impedance matching resistor 69 to ground 71. The other connection of switch 67 is connected to a parallel combination of a preemphasis circuit 73 and a shorting strap 75 before being output on a switch 77 which is connected via a lead 79 to the switching portion of the spare transmit switch in a block 81. As illustrated, the line 79 is connected to switch section 2 of switch 81. A type B or message signal is supplied on lead 83 to both a baseband amplifier 85 and a channel transmit switch 87. Within amplifier 85 is a preamplifier 89, a preemphasis or power redistribution block 91 and an output amplifier 93 supplying signals to an output 95 thereof. Also, within block 85 is a redundant command amplifier 97 receiving command signals on an input 99. The message signals are output over the main radio path for messages illustrated as 16 and supplied to a channel receive switch generally indicated as 101. As illustrated, the message channel 16 is deemed to be inoperative and a switch 103 within switch 101 is connected through a 75 ohm impedance matching resistor 105 to ground. Signals input to receive switch 101 from line 16 are still output through a pilot and command amplifier 107 to an output lead 109 to be detected in pilot and command detection block 110. The other terminal of switch 103 is connected to ground through a contact of a set of switches 121 and a matching resistor or grounding resistor 111 which would normally be used to provide impedance matching to a spare channel receive switch 113. The receive switch 113 has channel 1 thereof connected via a lead 115 through a switch 117 and a balancing or impedance matching pad 119 and the switches 121 to a deemphasis network or power redistribution block 123 within switch 101. An output of the switch 101 is taken from deemphasis network 123 to an output terminal 125. The spare transmit switch 81 receives spare channel or nonpriority signals on a lead 127 when it is not being used in its spare or high reliability capacity. When signals are received on 127, they are passed through a set of switches 129 and 131 to an output 133 of block 81 so as to be applied to an input of baseband amplifier 135. The signal within 135 is passed through a preamplifier 137, a shorting strap 139 and an output amplifier 141 before being output on a lead 143 to the spare radio path which is connected to lead or spare channel forwarding path 20. Forwarding path 20 is connected to an input of spare receive switch 113 where it is connected to an amplifier 145 which outputs pilot, ID and command signals to detection apparatus 146. It is further passed through a switch 147 to either the spare output or as shown to one of the sets of switches 149 internal thereto which, as shown, is illustrated connected to the receive switch 101 of the message signal channel.

Returning to block 29, it will be noted that there is an amplifier 150 contained therein. An ID signal generator 152 supplies signals to amplifier 150. Pilot signals are supplied to amplifier 150 on a lead 154. A similar amplifier 156 is found within transmit switch 87 and it has its own ID generator 158 and a pilot input lead 160. Finally, a pilot signal is input to an amplifier 162 in the spare channel transmit switch 81.

Figure 3:
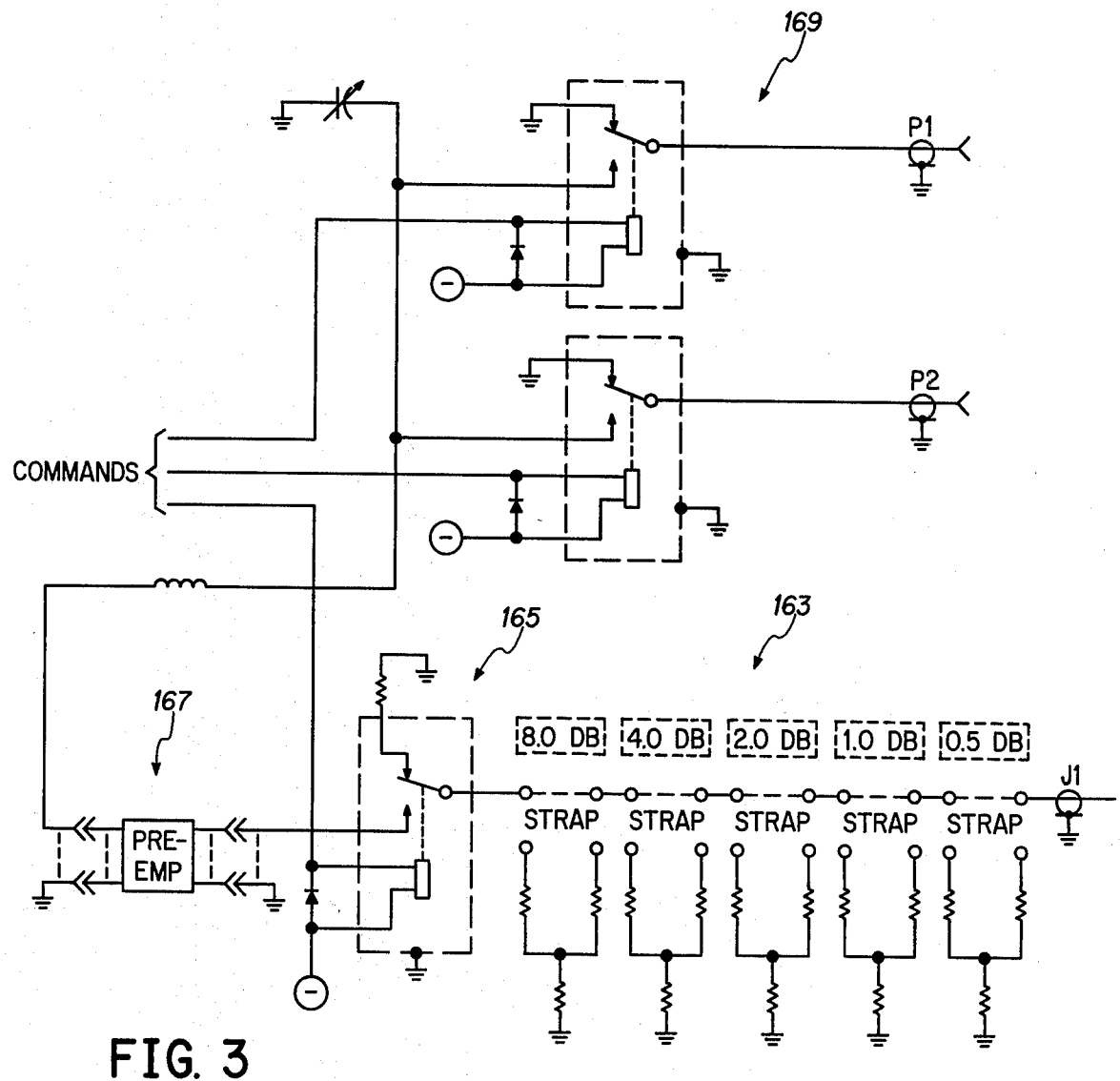
FIG. 3 is a detailed diagram of a channel transmit switch.

FIG. 3 illustrates a majority of the components within the transmit switches such as 29 except for the ID and pilot amplifier 150. The right-hand portion of FIG. 3 illustrates the pad which is used to adjust the signal level in binary increments. This is generally indicated as 163 and corresponds to 65 of FIG. 2. The signal is then passed through the switches 165 to a preemphasis network 167 before being output through switches generally indicated as 169. As will be emphasized later, it would not be normal to have both the pad 163 and the preemphasis network 167 operable simultaneously. However, for manufacturing simplification, it is sometimes easier and cheaper to include the networks within each and every switch such that they are all identical and merely use straps or shorting bars to eliminate the operation of the portions which are not necessary for the operation of a channel used in a particular manner such as for video or message signals.

Figure 4:
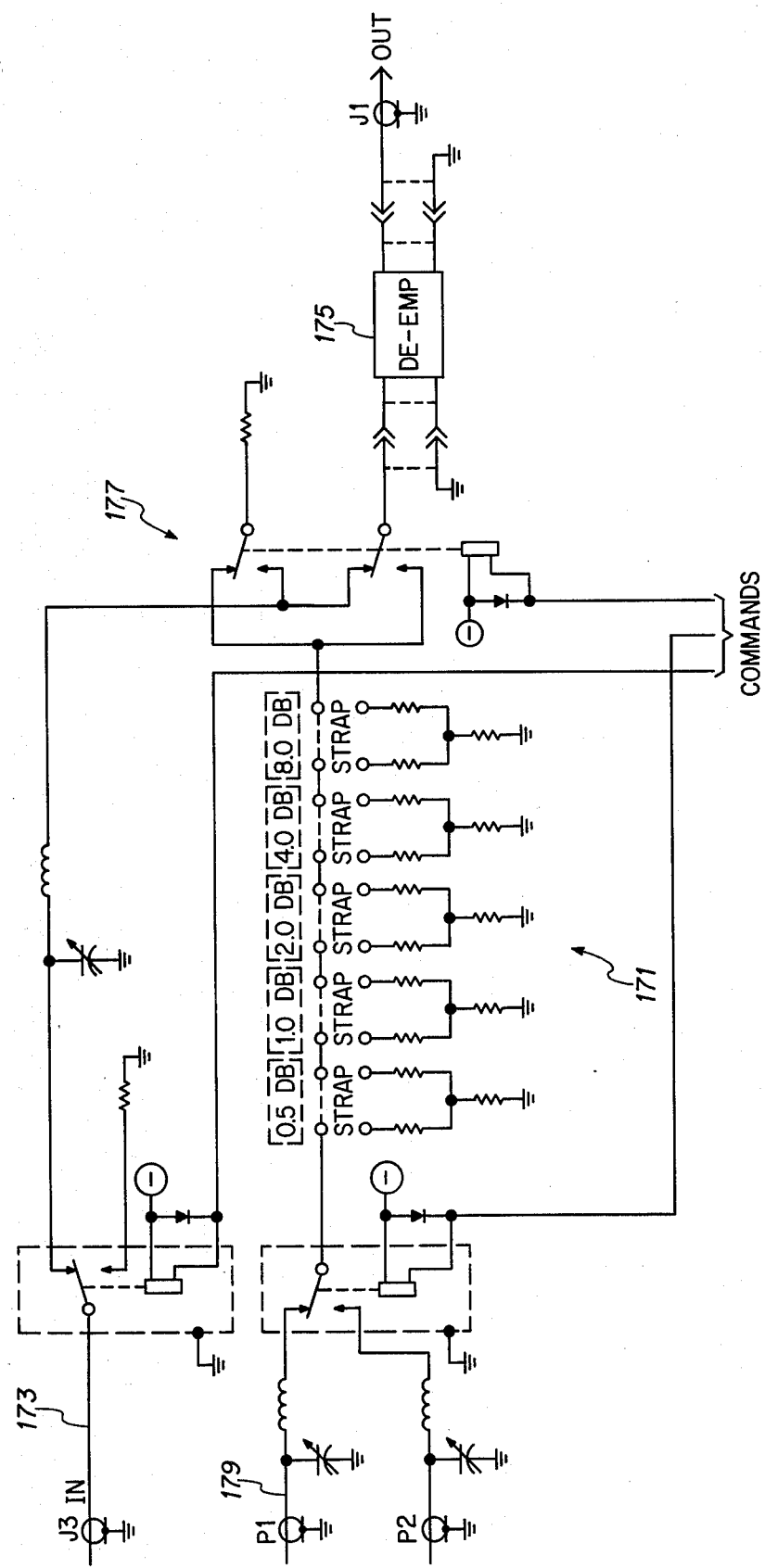
FIG. 4 is a fairly detailed diagram of a channel receive switch.

FIG. 4 illustrates in more detail the channel receive switches such as 101 in FIG. 2. The pad in this case is indicated as 171. The signals are normally input on lead 173 and applied to the passive preemphasis network 175 after being passed through switches 177. The spare signals are input on a lead 179 to the pad 171. Again, the pilot and command amplifier is not illustrated in the embodiment of FIG. 4.

OPERATION

In normal operation, video and message signals are transmitted through their primary communication channels and forwarded to the receive switch 14. The individual channels are strapped or manually switched in one embodiment of the invention so that they are designed to handle a specific type of signal (i.e., either video or message). If it were desired to transmit message signals on line 12 rather than the video signals presently shown as being transmitted, the only alterations would be to remove the short 35 from the preemphasis block 33 and change the short 75 in the channel transmit switch 29 from being in parallel with preemphasis unit 73 to being in parallel with the pad 65. On the receive end, the shorting bar 47 would have to be removed from across the deemphasis unit 49.

Thus, it can be easily determined that any of the channels can be quickly modified to accept either type A or type B signals. If, however, detection circuitry determines that a given upper path is inoperative, the signals in the upper channel can be diverted as shown so that they are passed through the channel transmit switch, the spare transmit switch and forwarded to the receive switch via the spare channel.

As previously mentioned, the spare channel would normally be used to transmit low priority signals when it is not needed for use as a spare to the primary or main channels.

A pilot signal is transmitted through the amplifier such as 150 in the top channel from source 154 and is passed through the entire line and detected from the output of amplifier 43. If this pilot is not in existence, it is assumed by the detection circuitry 44 that the path is inoperative and thus switching to the spare path must be accomplished. The identification signal supplied by 152 is passed through the spare channel and detected by detection apparatus 146. This equipment determines that it is the signal obtained from the upper channel 12 and thus connects the appropriate switch in the set of switches 149 (illustrated by the dash line connection) so that the signals may be returned to the receive switch 39 associated with channel 12 and output on lead 51. As will be noted, each of the amplifiers in the receive switch provide output signals indicative of pilot and command signals so that appropriate operations may be completed. These amplifiers also output ID signals but the only useful detection of this signal is accomplished by the detector 146.

It should be noted that each of the baseband amplifier units such as 27 has a preamplifier such as 31 for amplifying the signal prior to the preemphasis circuit 33. Although as illustrated, this preemphasis circuit is strapped and thus inoperative, it can still be determined that the amplifier 31 will improve the signal-to-noise ratio and NPR (noise performance ratio) by immediately amplifying the signal prior to it being operated upon by the preemphasis circuit. In actuality, the switching apparatus is able to provide better specifications on signals passed through the main paths than through the spare paths since the signal on the way to the spare path is passed through a preemphasis network prior to being applied to the preamplifier 137 in the spare baseband amplifier. While a preamplifier could have been included in each of the channel transmit switches prior to the preemphasis network, this would have added seven more preamplifiers to the total switch and accordingly increased the cost. Since lower signal quality is permitted when a main channel is already rendered inoperative, the present more cost effective approach was utilized. As will be noted, each of the baseband amplifiers is identical with the baseband amplifier 135 merely showing a strap 139 (instead of a strap and a preemphasis circuit) since block 135 never uses the preemphasis circuit.

As previously mentioned, the message path of the second switch channel is shown in a condition where it is assumed to have failed and signals are being transmitted instead through the spare path.

It may be assumed that the message path is restored to operability and when this occurs the pilot tone will again be output on lead 109 of amplifier 107. The detection circuitry 110 associated therewith will check the quality of the signal and inform the spare channel and the circuitry within transmit switch 87 that the spare channel is no longer needed. The switches are thus activated to pass the incoming signal on lead 83 through the amplifier 89, the preemphasis circuit 91 and the output amplifier 93 so as to be forwarded on path 16 to the receive switch 101. Within switch 101 the switches 103 and 121 will be altered and the deemphasis network 123 will start redistributing the power levels of the signals as received from the main message path rather than from the spare message path.

Thus, the switching apparatus is again in proper operation. If it may now be assumed that the video path 12 fails, the detection circuitry 44 will detect that a pilot signal is no longer received on line 12 and will check to see whether or not the spare channel is being used and when it detects that it is not being used will issue commands as input to the lower amplifier in each of the baseband amplifier blocks 27, 85 and 135 such that the appropriate switches are transposed in position and the signals appearing on path 25 are routed to the spare channel. The ID signal from 152 is detected by the circuitry in block 146 and the switch 45 is activated to return the type A signal from the spare channel through deemphasis network 49 and to output lead 51.

It will be appreciated by those skilled in the art that the switch is not limited to merely video and message signals but may utilize other types of signals, including more than two types and requiring other types of modifications to the signals rather than a preemphasis type modification.

It should be noted that in one embodiment of the invention, the message signals arrived on a lead such as 83 at a $-33$ DB. After passing through a preemphasis network such as found in switch 87, the signals were dropped to $-38$ DB. The video signals arriving on input 25, however, are at $-33$ DB but since they do not have to pass through the preemphasis circuit 73 on the way to the spare, they would still be at $-33$ DB when arriving at the baseband amplifier 135. Thus, the baseband amplifier would either present such large signals to the output transmitter on the spare radio path 20 that it would overmodulate the video signals or if the amplifiers were otherwise adjusted, it would present such low amplitude message signals that there would be a great amount of distortion as received in the receive switch 113. Thus, the pads such as 65 are used in the video paths (and shorted out in the message paths) to adjust the level of the signal at a crossover frequency or predesignated frequency band of signals such that its amplitude at that band or crossover frequency is identical to the preemphasized message signals as applied to the spare switch. Thus, the amplifiers within 135 provide substantially the same output amplitude signals on lead 143 for different types of signals and the spare channel transmitter operates with maximum power efficiency. A similar situation occurs in the receive switches 39 and 101. Thus, the pads 59 and 119 have been included to adjust the returned signals whereby the amplitude of the signal received on the input lines such as 12 and 16 correspond in amplitude as applied to the output with those being received on leads 57 and 115 respectively.

As a brief summary and referring to FIG. 1, it will be realized that in most instances the input signals will be passed straight through the transmit switches and output on their respective channel paths such as 12 and 16 to the receive switch 14. However, if a path such as the message path 12 fails, this signal is rerouted to the spare path 20. In rerouting, the amplitude of the video signal is adjusted before being applied to the spare path such that it will be substantially the same amplitude at a given frequency or frequency band as would occur with the message signals which must be preemphasized before transmitting. (As indicated supra, the video signals already have a type of preemphasis or predistortion applied thereto and do not need further modification to be transmitted). At the receive switch 14 the reverse procedure occurs wherein further pads are used to adjust the signals so that they are output on leads 1 or 2 etc., at substantially the same amplitude whether transmitted on the main channels or on the spare channel.

In further summarization, it will be noted that the circuitry for all channels is shown as common even though part of it is strapped to render it inoperative for certain types of signals. In some instances this is more cost effective than producing a multiplicity of different types of equipment and exchanging equipment to allow use of a channel for different purposes.

Although a single embodiment has been illustrated, it will be apparent that other configurations can be originated and still fall within the scope of the invention which is defined in the appended claims wherein I claim:

1. Switch apparatus comprising, in combination:
   first transmit means, including frequency-attenuation characteristic altering means, for transmitting signals altered to have a first frequency-attenuation characteristic;
   second transmit means, including frequency-attenuation characteristic altering means, for transmitting signals altered to have a second frequency-attenuation characteristic;
   spare transmit means for transmitting signals;
   first signal means for inputting signals of a first type;
   second signal means for inputting signals of a second type;
   means for normally connecting said first signal means to said first transmit means for supplying signals of said first type thereto and in the alternative connecting said first signal means to said spare transmit means for supplying signals of said first frequency-attenuation characteristic thereto; and
   means for normally connecting said second signal means to said second transmit means for supplying signals of said second type thereto and in the alternative connecting said second signal means to said spare transmit means for supplying signals of said second frequency-attenuation characteristic thereto, said switch apparatus functioning to transmit signals of either type on a single spare channel.

2. A switching system for use in forwarding at least two types of signals having noncompatible frequency-attenuation transmission characteristics wherein a single spare forwarding channel is used to provide transmission reliability comprising, in combination:
   first means for supplying at least one type A signal;
   second means for supplying at least one type B signal;
   first signal modifying means for variably attenuating type A signals as a function of frequency connected to said first means and providing first and second separately modified type A output signals for each type A signal supplied;
   first means for transmitting said first output signal provided by said first signal modifying means to a said receive switch load means;
   receive switch load means for receiving signals from said first means for transmitting and from other sources, said receive switch load means including receive compensation networks for both type A and type B signals and a spare receive switch channel to transfer any signal received on the spare channel to its appropriate assigned output channel;
   second signal modifying means for adjusting the power level of type B signals to approximately match the power level of said modified type A output signals and outputting first and second separately modified type B output signals;
   second means for transmitting said second output signal provided by said second signal modifying means to a said receive switch load means; and
   spare channel means, connected to said second output means of each of said first and second signal modifying means for selectively transmitting one of said modified output signals to said spare receive channel of said receive switch load means.

3. Multiple channel communication apparatus for forwarding signals, at least one of which signals requires power redistribution before forwarding comprising, in combination:
   a plurality of signal forwarding channels, each channel including main and spare circuits with each circuit being selectively alterable to provide power redistribution characteristics to signals passing therethrough;
   a spare signal forwarding channel selectively connected for receiving signals from one of said spare circuits associated with an inoperative main circuit forwarding channel; and
   means in said spare circuits for maintaining power levels of signals applied to said spare channel at substantially equal levels regardless of the source of the signals being forwarded.

4. The method of providing spare channel reliability protection to a plurality of signal channels operating to forward type A and type B signals;
   forwarding type A signals without alteration;
   redistributing power characteristics of type B signals;
   forwarding type B signals after redistribution of power characteristics thereof;
   modifying power characteristics of type B signals to be forwarded on a spare channel;
   adjusting the power level of type A signals to be forwarded on a spare channel to be substantially the same as type B signals for a reference frequency band after modification; and
   forwarding either modified or adjusted signals on a given spare channel when a signal type A or a signal type B primary channel fails.

5. Switch apparatus of the class described comprising, in combination:
   first means for supplying type A signals;
   second means for supplying type B signals;
   third means, connected to said first means, for forwarding said type A signals without alteration on a first primary communication channel;
   fourth means, connected to said second means, for redistributing the power characteristics of received type B signals;
   fifth means, connected to said fourth means, for forwarding the redistributed type B signals on a second primary communication channel;
   sixth means, connected to said second means, for modifying power characteristics of said type B signals;
   seventh means, connected to said first means, for adjusting the power level of type A signals to be substantiatly the same as type B signals after modification by said sixth means; and
   eighth means, connected to said sixth and seventh means, for forwarding either modified type B signals or adjusted type A signals via a spare communication channel when a primary communication channel is rendered inoperative.

6. Apparatus as claimed in claim 5 wherein:
   said fourth means includes means for redistributing the power characteristics of type B signals as a function of frequency;
   said type A signals as received have already been power-frequency redistributed for forwarding; and
   said sixth means modifies the type B signals as a function of frequency in substantially the same manner as said fourth means does.

* * * * *